United States Patent [19]

Iyanicki

[11] Patent Number: 4,798,404
[45] Date of Patent: Jan. 17, 1989

[54] PIPE COUPLING

[76] Inventor: Andrzej T. Iyanicki, Östrandsvägen 72, S-122 43 Enskede, Sweden

[21] Appl. No.: 598,327
[22] PCT Filed: Aug. 11, 1983
[86] PCT No.: PCT/SE83/00288
§ 371 Date: Mar. 23, 1984
§ 102(e) Date: Mar. 23, 1984
[87] PCT Pub. No.: WO84/00796
PCT Pub. Date: Mar. 1, 1984

[30] Foreign Application Priority Data

Aug. 11, 1982 [SE] Sweden ............................ 8204648

[51] Int. Cl.⁴ .......................................... F16L 19/06
[52] U.S. Cl. ................................... 285/12; 285/382.7; 285/249; 285/341; 285/357; 285/385; 285/348
[58] Field of Search ................. 285/341, 12, 323, 177, 285/354, 384, 385, 348, 232, 357, 249, 382.7

[56] References Cited

U.S. PATENT DOCUMENTS

| | | | |
|---|---|---|---|
| 500,412 | 6/1893 | McIntyre | 285/357 |
| 502,665 | 8/1893 | Friede | 285/12 X |
| 640,183 | 1/1900 | Dresser | 285/339 |
| 747,152 | 12/1903 | Draper | 285/12 X |
| 1,665,346 | 4/1928 | Clarke | 285/323 X |
| 2,172,532 | 9/1939 | Fentress | 285/357 |
| 2,301,280 | 11/1942 | Nowe | 285/232 |
| 2,405,822 | 8/1946 | Frank | 285/232 |
| 2,434,846 | 1/1948 | Hagan | 285/232 |
| 2,503,826 | 4/1950 | Lamont | 285/340 |
| 2,547,318 | 4/1951 | Harding | 285/340 |
| 2,943,871 | 7/1960 | St. Clair | 285/342 |
| 3,074,747 | 1/1963 | Bougnton | 285/342 |
| 3,194,592 | 7/1965 | Boughton | 285/342 |
| 3,275,350 | 9/1966 | Kody et al. | 285/341 |
| 3,434,745 | 3/1969 | Jackman | 285/423 |
| 3,484,123 | 12/1967 | Van Der Velden | 285/341 |
| 3,733,093 | 5/1973 | Seiler | 285/348 |
| 3,972,547 | 8/1976 | Itoya | 285/341 |
| 3,986,736 | 10/1976 | Takagi et al. | 285/341 |
| 3,986,737 | 10/1976 | Krusine | 285/341 |
| 4,019,762 | 4/1977 | Eidelberg | 285/341 |
| 4,059,297 | 11/1977 | Grahl et al. | 285/341 X |
| 4,235,461 | 11/1980 | Normark | 285/341 |
| 4,257,629 | 3/1981 | Maple et al. | 285/12 |
| 4,303,263 | 12/1981 | Legris | 285/249 |
| 4,309,050 | 1/1982 | Legris | 285/341 |
| 4,413,845 | 11/1983 | Lawrence | 285/323 |
| 4,431,216 | 2/1984 | Legris | 285/249 |
| 4,586,731 | 5/1986 | Castrup | 285/341 |

FOREIGN PATENT DOCUMENTS

| | | | |
|---|---|---|---|
| 204520 | 3/1956 | Australia | 285/249 |
| 1284753 | 12/1968 | Fed. Rep. of Germany | 285/249 |
| 2340717 | 2/1974 | Fed. Rep. of Germany | 285/249 |
| 2259850 | 6/1977 | Fed. Rep. of Germany | . |
| 2316531 | 10/1977 | Fed. Rep. of Germany | . |
| 2438224 | 10/1978 | France | . |
| 43122 | 4/1977 | Japan | 285/249 |
| 16916 | 1/1978 | Japan | 285/341 |
| 6607657 | 1/1967 | Netherlands | 285/249 |
| 1530205 | 10/1978 | United Kingdom | 285/341 |
| 2002079 | 2/1979 | United Kingdom | 285/249 |

Primary Examiner—Gary L. Smith
Assistant Examiner—Eric K. Nicholson
Attorney, Agent, or Firm—Oblon, Fisher, Spivak, McClelland & Maier

[57] ABSTRACT

The invention relates to a pie coupling, including a connection (3), arranged to receive with sliding fit a coupling member (5) which, on forced axial displacement into or in over the connection, is intended to act on clamping and sealing means (6), for translating the compression forces generated by the axial compression into radial compression forces against a pipe or coupling piece (1) inserted into the coupling. The connection may be implemented as a coupling housing (85) having both internal and external threads. Within the threaded area the coupling member may be formed with a cylindrical recess (45) fitting a cylindrical surface (154) provided with an optional type of thread. In accordance with an alternative embodiment, the connection may be equipped with a collar coacting with gripping means (70) equipped with hooks. The clamping and sealing means (6) is retained in the coupling member by coaction between a projection (9) and a locking flange (10).

1 Claim, 15 Drawing Sheets

FIG. 48a

PIPE COUPLING

FIELD OF THE INVENTION

The present invention relates to a pipe coupling, including a connection which is adapted to accommodate with sliding fit a coupling member which, on forced axial displacement into, or over the connection, is intended to act on clamping and sealing means axially compressible by the coupling member or connection in which it is inserted, for translating the compression forces generated by the axial compression into radial compression forces against a pipe or coupling piece inserted in the coupling, such as to fix and seal the coupling.

BACKGROUND OF THE INVENTION

Pipe couplings of this kind for smooth plastics are already known under different trade names such as ISIFLO (reg. trademark) or PRK (reg. trademark), while couplings for smooth metal pipes are known under the trademarks KUTERLITE, VATETTF and CONEX. These known structures are burdened with different disadvantages, however.

The ISIFLO coupling includes clamping and sealing means consisting of several separate parts that must be inserted in a given order in a coupling housing, after which the coupling member, in this case consisting of a nut, is screwed into the coupling housing, the coupling then being fixed and sealed against the pipe. Since the different coupling details must be placed the right way round and in the right order in the coupling, there is always the risk that someone places a detail the wrong way round or in the wrong order, which seriously deteriorates the function of the coupling and also its ability to maintain good sealing for a long time. The latter property is naturally of great importance, since couplings of this kind are often buried to a great depth in the ground, resulting in considerable costs if the coupling must be exchanged or repaired.

The PRK coupling has other disadvantages connected with the fact that the coupling member a nut in this case as well, is made from plastics and formed such that, when it is screwed into the coupling housing, it is pressed around the pipe to give the intended sealing function. Thus, a part of the nut constitutes the clamping and sealing means in this case, which has the drawback that the nut will be very difficult to loosen after it has been tightened because the plastics details have been deformed in compression round the pipe. With this structure also, there is a risk of a deteriorated long-time sealing function of the coupling, should the nut have been incorrectly screwed into the housing, the metal threads in the housing thus being caused to cut up the considerably softer plastics threads of the nut, resulting in that the coupling is torn apart, e.g. when it is subjected to a high internal liquid pressure.

Each of the mentioned couplings has limited adaptability, and can only be utilized for connecting two pipe dimensions from one and the same side of the coupling. The pipe ends may not be of the same type, however-i.e., one must be smooth and the other threaded.

GENERAL DISCUSSION OF THE INVENTION

These disadvantages have been alleviated in the pipe coupling in accordance with the present invention, essentially in that the clamping and sealing means is formed with a peripheral and radially outwardly directed projection which is intended to be taken behind a locking flange disposed on the coupling member or connection, this locking flange being radially inwardly directed and having a lesser inner diameter than the outer diameter of the projection, whereby the clamping and sealing means is retained in the coupling member or the connection.

The coupling is supplied with all the coupling details inserted and retained either in the coupling member or in the connection.

In accordance with the invention, the coupling member may be implemented in the shape of a nut which is screwed tight onto the threaded connection, which may consist either of a coupling housing or of a threaded pipe end. In the latter case, the clamping and sealing means is of course inserted and retained in the nut.

According to a further embodiment, the connection and coupling member may be provided with flanges which are joined together with the aid of a throughgoing screw joint. The axial displacement is then provided by tightening up the screwed joint so that the clamping and sealing means can perform its fixing and sealing function in the coupling.

The invention also relates to a pipe coupling including a coupling housing formed with threaded pipe connections for nuts which, with accompanying forced axial movement, are screwed into in over the coupling housing for acting on the clamping and sealing means.

Couplings of this kind, which include both coupling housing and nuts, must be stocked for all the pipe dimensions on the market, to enable pipe connections, e.g. in the form of joints, adapters, tees, elbows and direct pipe connections in plastics and metal pipes. In order to satisfy the requirements of the market, it is necessary to stock different dimensions and coupling alternatives at all sales outlets, resulting in that a large amount of capital must be invested in stock on the manufacturing side as well as on the sales side, in turn leading to large interest losses which must be covered by the price of the different connection details. Costs for the storage volumes utilized will also be considerable, and not inconsiderably affect the product price.

In order to come to grips with these problems and considerably to reduce the need of stocking components, without the coupling variations available to the users being reduced on this score, there is provided in accordance with the invention a pipe coupling distinguished in essentials by each pipe connection and/or associated nut being threaded both internally and externally, whereby each of the connections can be used with two nuts of different dimensions, and/or each nut can be used with two connections of different dimensions. Since outside and inside threads on each connection end of the detail decrease its strength properties, there must be a given minimum thickness between the threads. This may be provided by a total increase of the material thickness, which makes the product more expensive and heavier, however.

In accordance with one embodiment of the invention, it is therefore proposed that the internal and external threads on each connection and/or nut have a mutual, axial displacement of half a pitch. This also enables an optimum increase in the diameter of the connections.

To enable rapid connection between a pipe end and a coupling member, there is provided in accordance with the invention a structure in which the coupling member has axially projecting, resilient gripping means having radially inwardly projecting hooks intended to engage with a collar disposed on the peripheral surface of the connection and having a radially projecting edge facing away from the gripping means, the coupling member also comprising two parts in screw-threaded engagement, the parts retaining the gripping means as well as the clamping and sealing means with the aid of locking flanges formed on the parts. When the parts of the coupling member are screwed together, the means are pressed into engagement against the collar edge as well as against the peripheral surface of the connection or the pipe or coupling member.

In the prior art there is required, as already mentioned, extensive stocking to meet the demands of the market for conceivable connection combinations. On top of this, the market must also cater for a variety of screw thread systems such as Whitworth, ASA and Metric. These different systems make stocking couplings even more complicated, since the threads of the different systems are not compatible.

A further object of the invention is therefore to enable a pipe coupling structure including a pipe connection provided with external and/or internal threads, which is intended to receive a coupling member provided with complementary external and/or internal threads. The pipe connection and/or the coupling member are thereby formed in the threaded area with a recess for a cylindrical surface fitting into the recess and provided with an optional type of thread. The threaded cylindrical surface is provided with one or more substantially axial slots dividing the cylindrical surface into one or more arcuate surfaces. The recess is thereby formed with radially projecting abutments fitting into grooves in the cylindrical surfaces such as to prevent or restrict peripheral rotation of these surfaces. In accordance with an alternative embodiment, the recess is provided with grooves in which there is accommodated a radially inwardly projecting abutment on the cylindrical surface.

BRIEF DESCRIPTION OF THE DRAWINGS

Some embodiments selected as examples of pipe couplings in accordance with the invention are described in detail below with reference to the accompanying drawings, where.

DETAILED DESCRIPTION OF THE PRESENTLY PREFERRED EMBODIMENTS

Figure 1:
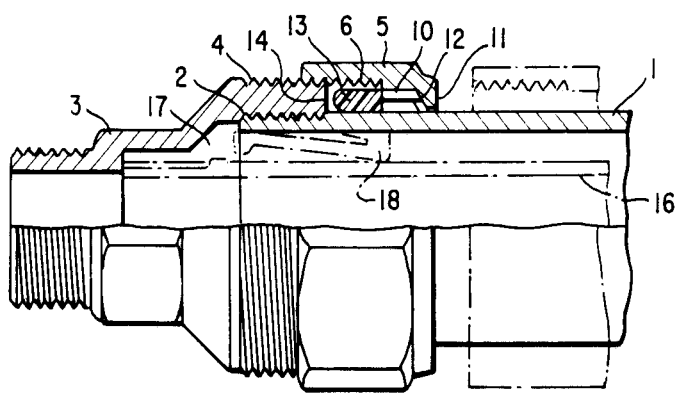
FIG. 1 is a cross section through a pipe coupling in accordance with the invention, with a connection formed as a coupling housing mounted on a threaded pipe end.
Figure 2:
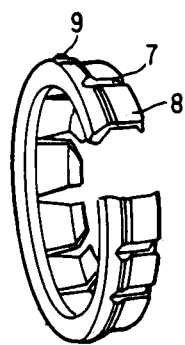
FIG. 2 is a perspective view of a clamping and sealing means according to FIG. 1 but without an elastic sealing ring.

A pipe coupling in accordance with the invention is depicted in FIG. 1, where a metal pipe 1 has its end formed with external threads that engage interior threads 2 in a connection 3, in this case implemented as a coupling housing for an adapter or reduction joint between pipes of different diameters. The housing 3 is further provided with an exterior thread 4 such as to receive threadably a coupling member 5, in this case formed as a nut provided with threads. When the nut 5 is screwed in, it is axially displaced and thereby acts on a clamping and sealing means 6, in this case comprising a clamping ring 7, illustrated in FIG. 2, and formed with clamping elements 8, as well as a circumferential, radially outwardly directed projection 9, intended to be moved in behind a locking flange 10 arranged on the nut 5. The lcoking flange 10 is directed radially inwardly and has a lesser internal diameter than the external diameter of the projection 9, thus ensuring that the clamping and sealing means 6 is retained in the nut 5. This is of course dependent on the nut 5 being provided with a guide flange 11 coacting with engagement means 12, which comprise a part of the clamping elements 8 and are directed towards the circumferential surface of the pipe 1.

The clamping and sealing means 6 is thus retained in the nut 5 between the guide flange 11 and locking flange 10. The sealing function is achieved by the clamping and sealing means 6 carrying an elastic seal 13 at its outer end, the elastic seal 13 being pressed against a guiding and sealing surface 14 on the housing 3 when the nut 5 is screwed into the exterior threads 4 on the housing 3, the axial force being translated into radial compression forces against the circumferential surface of the pipe 1. When the coupling is screwed together, the guide flange 11 of the nut also acts on the engagement means 12 so that it is pressed into the pipe 1, thus firmly fixing the coupling on the pipe end. The coupling member 5 illustrated in FIG. 1 serves primarily as a seal, since the coupling housing 3 is screwed tight on to the external thread 2 of the pipe end, but also has a mechanically reinforcing function that considerably reduces the risk of leakage, should be coupling be subjected to mechanical action e.g., bending the pipe as a result of movement in the ground.

Figure 3A:
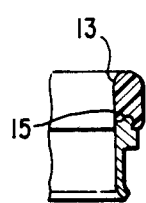
FIG. 3 illustrates an alternative clamping and sealing means in accordance with the invention, i.a. of the type used with a coupling according to FIG. 8. The upper Figure is a cross section of the means, and the lower Figure is a view from the front.
Figure 3B:
Figure 8A:
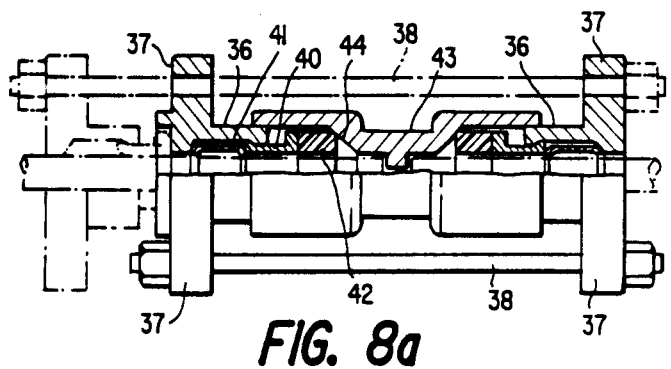
FIG. 8 is a cross sectional through another inventive coupling, where the Figure to the left illustrates flanged coupling members, kept together by screw joints, and the Figure to the right a flanged connection and a flanged coupling member united by screw joints.
Figure 8B:
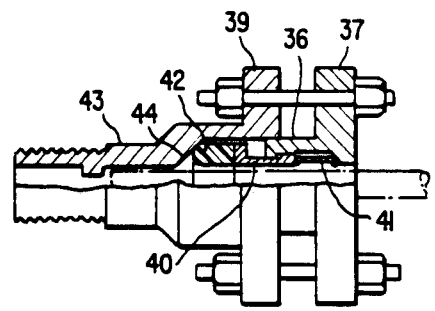

FIG. 3 illustrates an alternative embodiment of clamping and sealing means intended for use in conjunction with a pipe coupling, e.g. of the kind apparent from FIG. 8. The elastic seal 13 which was glued directly on the clamping ring 7 in the embodiment of FIG. 1, is more securely attached to the clamping ring 7 with the aid of a bead 15 accommodated in a complementary recess in the elastic seal 13.

The dashed lines in FIG. 1 indicate how the coupling housing 3 may be used for connecting a pipe 16 of substantially lesser diameter than the pipe 1, drawn in full lines. A locking ring 17 is then utilized, which is threaded on to the pipe end and serves as a guide surface for the elastic seal 13. In this, case the clamping and sealing means 6 is acted on by an externally threaded nut 18 which is screwed into the internal thread 2 of the coupling housing 3. It is also shown in FIG. 1 how the coupling housing 3 may be used for direct connection to a large-diameter pipe having an internal thread which is then screwed directly to the external thread 4 of the housing. The clamping and sealing means of the invention is not used, and the pipe must be sealed conventionally.

Figure 6:
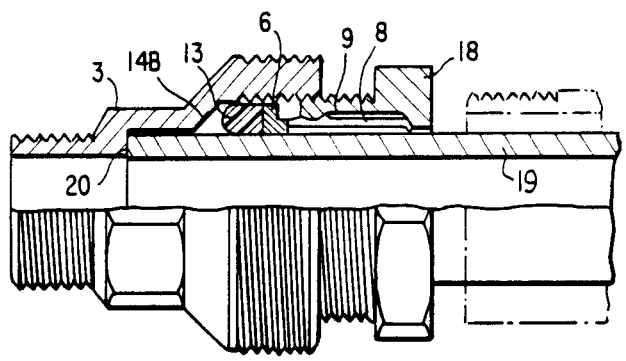
FIG. 6 is a cross section through an inventive coupling intended for plastics pipes, and with a clamping and sealing means of substantially the same type as in FIG. 1.

FIG. 6 depicts a coupling similar to the one in FIG. 1, but here the pipe 1 is replaced by a pipe 19 made of plastics and is solely inserted in the coupling housing 3 against a pipe seating 20 formed therein. In this case it is thus essential that the clamping and sealing means 6 satsifies its sealing as well as its fixing function for the coupling to remain an entirety when the interior of the pipe 19 is subjected to pressure. The function of the clamping and sealing means 6 is otherwise the same as described in conjunction with FIG. 1 for a nut 18 having an external thread.

Figure 7:
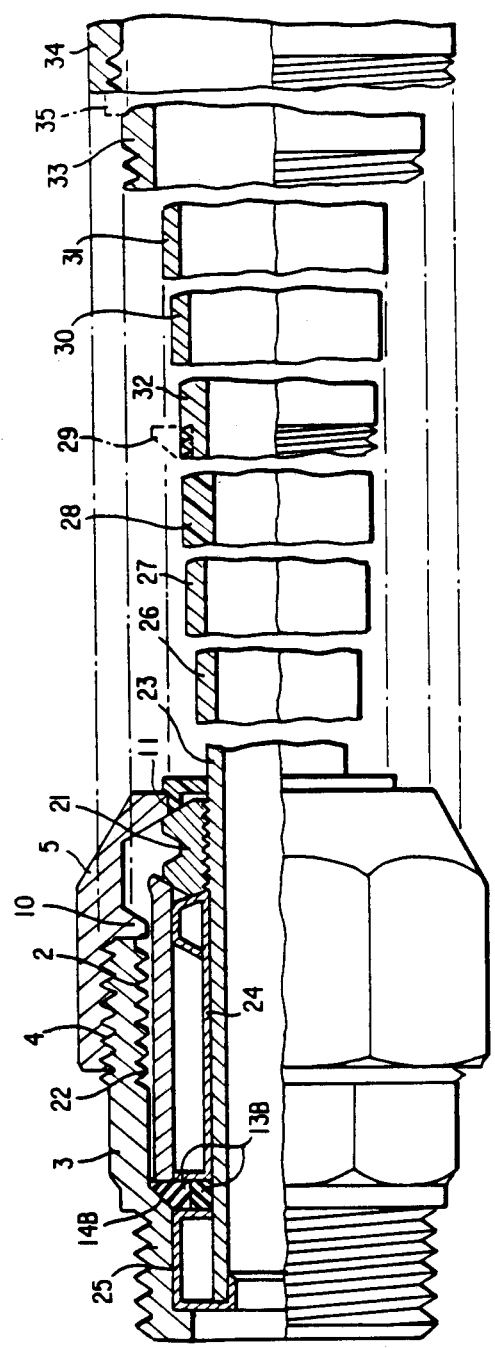
FIG. 7 is a cross section through another embodiment of an inventive coupling, and also illustrates the pipe dimensions that may be used with this coupling.
Figure 9:
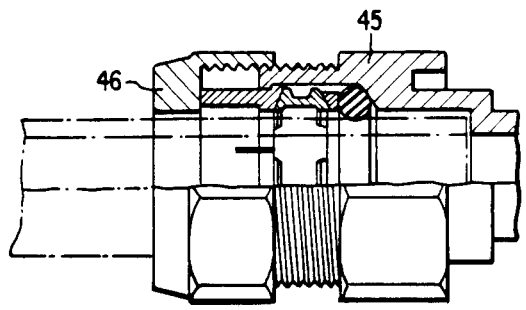
FIGS. 9–12 illustrate different embodiments of clamping and sealing means mounted in the coupling housing and also in the nut.

FIG. 7 illustrates how the coupling in accordance with the invention may be used for connecting a plurality of differently dimensioned pipes of different materials. In this embodiment the clamping and sealing means 6 is formed as two rings. One ring might be said to serve solely as a clamping ring 21, while the other ring serves as guide and sealing ring 22. The left-hand end of the guide and sealing ring 22 bears against the elastic seal 13B, which in turn bears against the guiding and sealing surface 14B (i.e., the step in the stepped bore of the connection/coupling housing 3). It will also be seen how differences in dimension between a pipe 23 and the coupling housing 3 are taken up by bushes 24 and 25, which must be adapted to each pipe dimension connected to the coupling housing 3. The latter also accommodates the nut 5 having an internal thread, which is shown here solely to demonstrate that the coupling may also be used in the case where the dimension difference between coupling and pipe is considerable. The coupling housing 3 is threaded both on its exterior 4 and, on its interior 2, and in the case illustrated in FIG. 7 the connection could also be made using a nut with an external thread. The guiding and sealing ring 22 coacts with the guide flange 11 of the nut 5, and it is correspondingly provided with sloping guide surfaces which are pressed against guide surfaces on the clamping ring 21 when the nut 5 is screwed in, thus pressing the clamping ring 21 against the circumference of the pipe 23. To obtain a better grip on the pipe surface, the clamping ring 21 may be provided with ridges which give a better grip on the pipe surface. The coupling may thus be utilized for pipes of other dimensions than that of the pipe 23 illustrated. The same clamping and sealing means may be utilized for all the pipes 26-31. Only pipes 26-28 need specially adapted bushes. The pipe 29 is a metal pipe with a threaded end on which is mounted a locking ring 32, adapted to the pipe seating in the coupling housing 3. The pipe 33 may be threaded directly on to the internal thread 2 of the coupling housing 3, while the pipe 34, which has the greatest diameter, may be connected with the aid of a threaded coupling ring 35. The clamping ring 21 illustrated in FIG.

Figure 4:
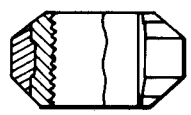
FIGS. 4 and 5 illustrate alternative implementations of inventive clamping means used, i.a., with the coupling according to FIG. 7.
Figure 5:
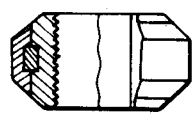

7 can be realized in different ways, depending on the material from which the inserted pipe is made. Some alternative embodiments are apparent from FIGS. 4 and 5, where the clamping ring 21 is parted and an elastic material is inserted between the parts such that the clamping ring 21 may yieldingly adjust itself to the pipe surface. Parting enables the use of a clamping ring 21 with a large difference between internal and external diameters.

FIG. 8 illustrates that the inventive pipe coupling can also be applied to couplings kept together by screws joints. The left-hand figure illustrates a coupling where the coupling member 36 is formed with flanges 37, mutually connected by through screws 38. The right-hand Figure depicts a simple coupling between a flanged coupling housing 39 and a similarly flanged coupling member 36, 37. The clamping and sealing means in the pipe couplings illustrated in the Figure are of the type described in conjunction with FIG. 3, and as with the embodiment of FIG. 7, the means comprises two parts, namely a guiding and sealing ring 40 and a clamping ring 41. When the coupling is tightened with the aid of the screws, the elastic sealing member 42 will be pressed against the guide surface 44 of the housing 43, radial compressive forces being generated against the pipe inserted in the coupling.

Figure 10:
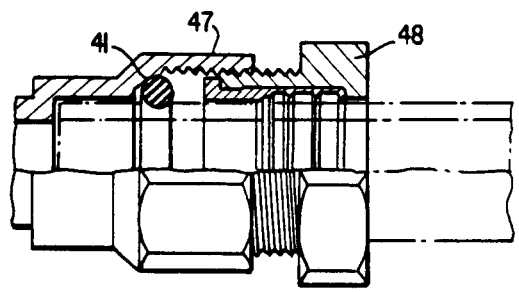

FIGS. 9-12 illustrate different embodiments of a pipe coupling in accordance with the invention. The housing 45 of FIG. 9 has an external thread for retaining the clamping and sealing means in the housing, where the sealing function thus takes place. FIG. 10 depicts a housing 47 with an internal thread and a nut 48 with an external thread. The clamping and sealing means, also parted in this cse, is retained in the nut 48 while the sealing member is separated from the clamping member and consists of a conventional O-ring 49.

Figure 11:
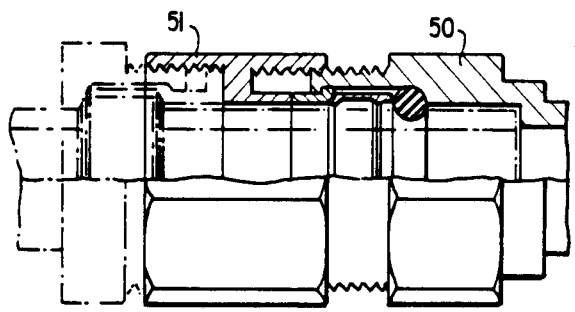
Figure 12:
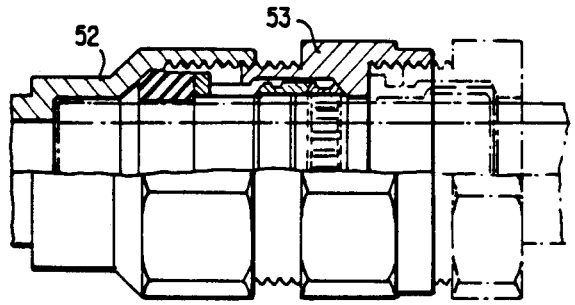

FIG. 11 illustrates the clamping and sealing means firmly retained in a coupling housing 50, where the nut 51 is threaded at both ends with the possibility of connection from the side facing away from the housing 50 also. A further embodiment with a housing 52 and a nut 53 is illustrated in FIG. 12, where the clamping and sealing means is firmly retained, and the clamping function is exercised in the nut 53. The nut 53 is threaded at both ends in this case as well, with the possibility of further connection on its outside.

Figure 13:
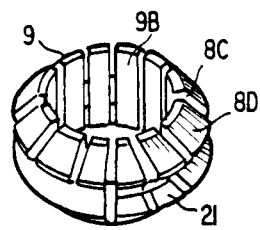
FIGS. 13–17 illustrate different embodiments of the clamping and sealing means.
Figure 14:
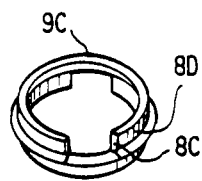
Figure 15:
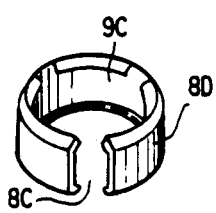
Figure 16:
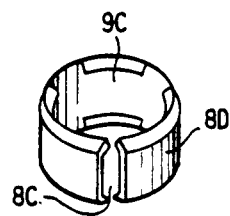
Figure 17:
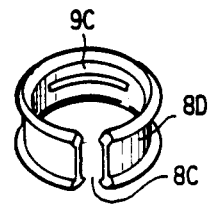

FIGS. 13-17 illustrate different forms of clamping rings in accordance with the invention, the left-hand half of FIG. 13 depicting one type of ring while the right-hand half depicts another, both being provided with a plain interior for engagement against the pipe. FIG. 15 illustrates a clamping ring of the type apparent from FIG. 11, for example with hooks or ridges directed towards the outside of the pipe. Alternative embodiments of such rings are apparent from FIGS. 16 and 17.

Figure 18:
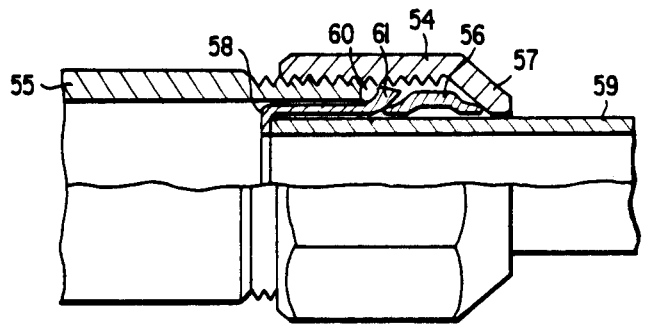
FIG. 18 illustrates an inventive coupling mounted directly on to a pipe end and provided with a movable flange for retaining the clamping and sealing means.
Figure 19:
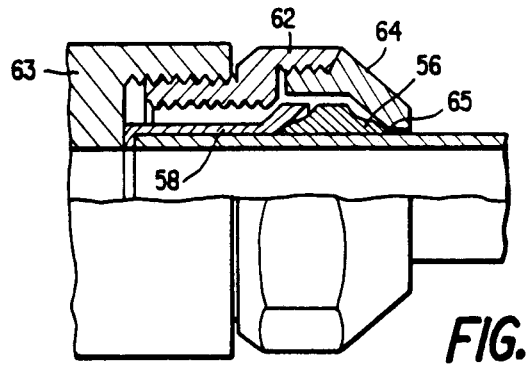
FIG. 19 illustrates an alternative connection directly on to a pipe end with a coupling member parted in two.
Figure 20:
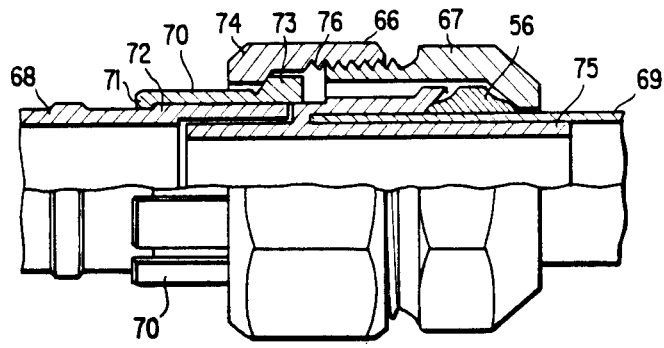
FIG. 20 illustrates a quick-release coupling for a soft or thin-walled pipe end.

FIGS. 18-20 illustrate pipe couplings in accordance with the invention and having in common that a coupling member in the shape of a nut is mounted directly on the end of a pipe or a coupling piece. FIG. 18 thus illustrates a coupling including an internally threaded nut screwed on to an externally threaded pipe 55. The clamping and sealing means comprises in this case two clamping rings, of which one 56 is compressed between a guide flange 57 on the nut 54, and a complementary guide surface on a second part 58 of the means, the part 58 having the function of locking the clamping ring and also serving as a seat for the smaller pipe 59 inserted in the coupling. The locking flange arranged in the nut has the form of a threaded ring 60 in this case, for engaging with the radially outwardly directed projection 61 from the ring 58. By this arrangement the locking flange can thus be screwed out of the nut, and the clamping and sealing means exchanged for another set as required. As will be seen from the Figure, a threaded pipe 55 may be connected to another unthreaded metal pipe 59. FIG. 19 illustrates a similar arrangement, but here the nut is in two parts, of which the inner 62 is provided with external and internal threads, and is screwed into a pipe end 63, while the outer part 64 is provided with a guide flange 65 for being acted on by the conical clamping ring 56 and the other parts of the clamping and sealing means 58. There is no movable locking flange in this embodiment for fixing the clamping and sealing means in the nut, but the same availability of exchanging the means is achieved as for the embodiment in FIG. 18, since the outer part of the nut 64 may be screwed off from the inner part 62, pursuant to which the means can be exchanged.

FIG. 20 illustrates a further alternative embodiment of a coupling, where the coupling member comprises two parts 66 and 67 in mutual threaded engagement and intended for coupling together between a connection in the form of a coupling piece 68 and a thin-walled, unthreaded pipe 69. A quick-release coupling with a coupling means 66, 67 is used to connect the pipe 69 and the coupling piece 68, the means including partially projecting and resilient gripping means 70, provided with radially projecting hooks 71 intended to engage with a collar 72 arranged at the peripheral surface of the connection, the collar 72 having a radially projecting edge facing away from the gripping means. When the parts 66 and 67 of the coupling means are screwed together, an inner upstanding end 73 on the gripping means is acted on by a guide flange 74 on the forward part 66 of the means, simultaneously as the clamping and sealing means, in a manner described in conjunction with FIG. 19. However, in this case the clamping and sealing means is formed with an inner ferrule 75 extending inside the thin-walled pipe 69 as well as inside the coupling piece 68. There is thus formed an abutment and sealing surface 76 for the coupling piece, and also a bearing surface for the radial clamping forces generated by the clamping ring 56 when both parts 66 and 67 of the coupling member are screwed together.

Figure 21:
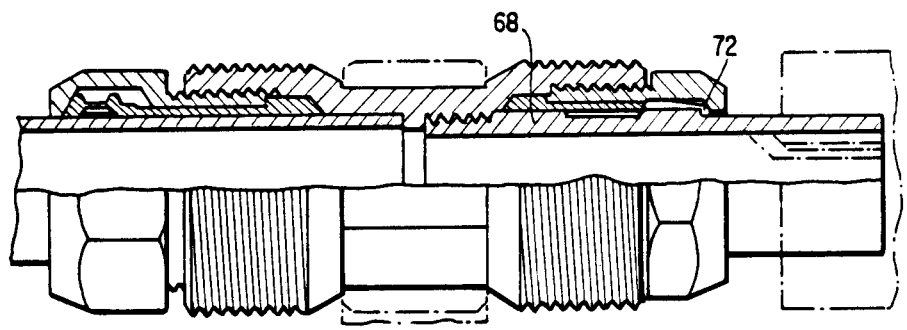
FIG. 21 is a cross section of an inventive coupling, where the right-hand Figure illustrates a quick-release coupling round a collar on the pipe.
Figure 22A:
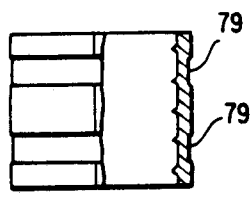
FIG. 22 is a cross section and a longitudinal section through a collar for a quick-release coupling attachable to a pipe.
Figure 22B:
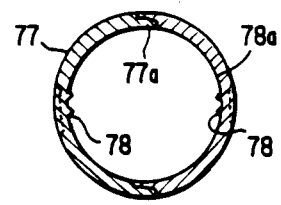

FIG. 21 illustrates an alternative form of a pipe coupling in accordance with the invention, the connection to the right taking the form of a quick-release coupling, while the part to the left depicts a seal of the kind described in conjunction with FIG. 7, for example. In the coupling to the right the collar 72 is formed integrally with the coupling piece 68 which is also the case for the embodiment according to FIG. 20, but this collar may of course be a coupling detail which is fixed to the coupling piece as required. An example of such an attachable collar is apparent from FIG. 22, where the upper part depicts a sectioned view of the collar 77 which is provided on its interior surface with hooks 78 intended to engage with the circumferential surface of the pipe. The collar is in two sections, kept together by resilient bands 79. The hooks may be formed in the collar or comprise separate carbide elements inserted in grooves in the collar. The inside of the latter may be provided with grooves 78a for seam welds, if needed. The collar suitably comprises two halves, the edges of which are formed for locking together with each other when the hooks have penetrated into the pipe surface. The containing function of the bands 79 is thus eliminated.

Figure 23:
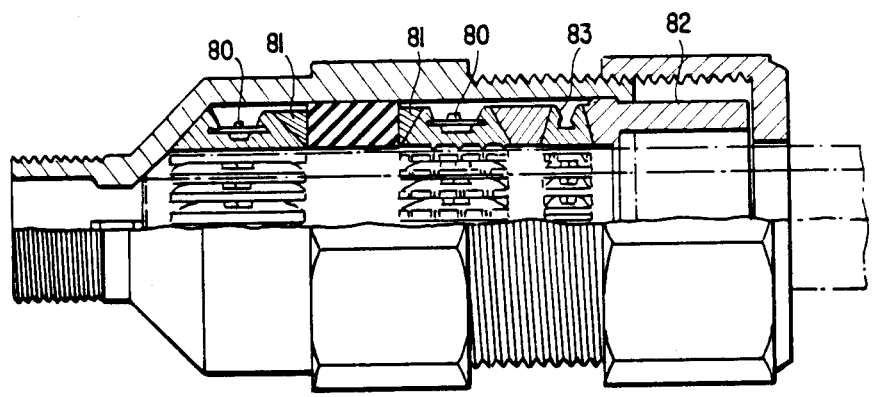
FIG. 23 illustrates a so-called repair coupling with different types of clamping means for pipes of different materials.

FIG. 23 illustrates a coupling of the type used for repairs, and includes different types of clamping rings for different materials. The clamping rings are kept together by ribbon-like locking springs 80, and the axial forces are translated to the clamping rings with the aid of cuneiform guide rings 81. A locking ring 82 is mounted on one end of the coupling and acts on an expansion ring 83, kept together by two stretchable wires.

Figure 24:
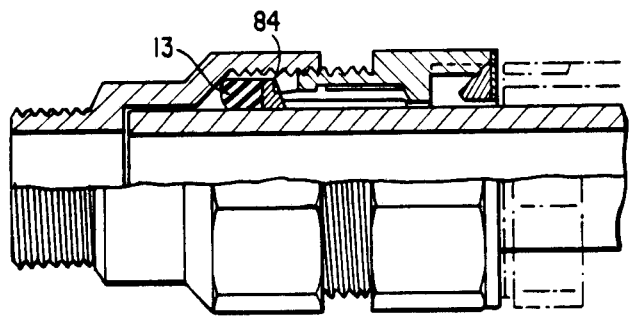
FIG. 24 illustrates a coupling for a plastic pipe similar to FIG. 6, but with the facility of rearward pipe connection.

FIG. 24 illustrates a coupling for connecting a plastics pipe of the same kind as depicted in FIG. 6, but where the elastic sealing member 13 is otherwise joined to the clamping and sealing means by a mechanical and resilient joint 84.

Figure 25:
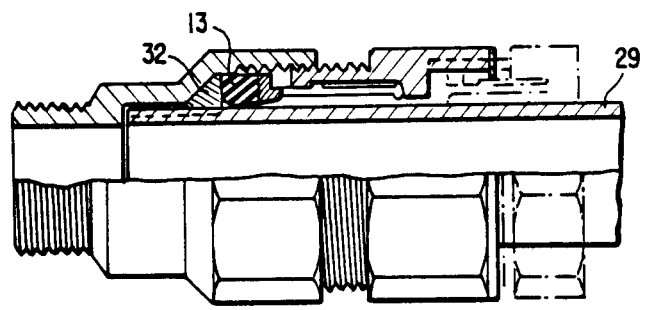
FIG. 25 illustrates a coupling for a threaded pipe with a locking ring.

FIG. 25 illustrates a coupling for a threaded pipe 29 of the kind with a locking ring 32, as seen in FIG. 7.

Figure 26:
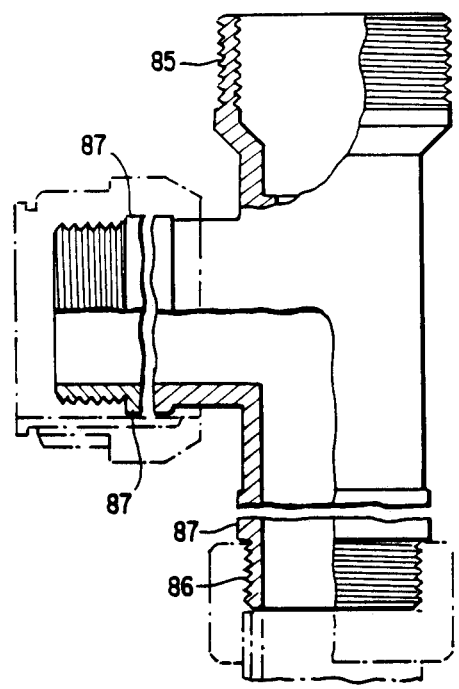
FIG. 26 is a cross section through a Tee coupling with three different types of connection in accordance with the invention.

FIG. 26 illustrates a Tee with two alternative connection facilities at either end. The right-hand connecton 85 is threaded internally and externally and has a collar 87 for quick-release coupling, as well as an external thread. The upwardly-facing connection similarly has a collar 87 for quick-release coupling, as well as an external thread.

Figure 27:
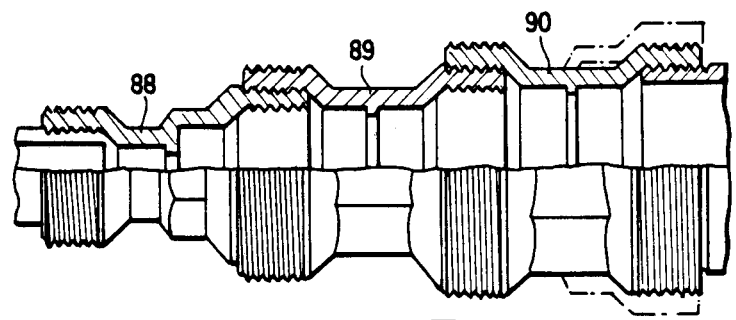
FIG. 27 illustrates connection facilities between alternative embodiments of straight and adapter couplings in accordance with the invention, using a double-threaded coupling housing.

FIG. 27 illustrates three coupling housings 88, 89 and 90, all of which are threaded externally and internally at each connection end. The first housing 88 is for a so-called adapter, going from a small to a larger diameter, and can thus connect to a straight-through coupling housing 89 which can also serve as an adapter coupling, since the internal thread on the left-hand side and the external thread on the right-hand side may be utilized, the latter being screwed into the largest coupling housing 90, where full lines depict a straight-through coupling and dashed lines an adapter coupling. The Figure is thus an illustration of the coupling possibilities available when external and internal threads are used according to the invention.

Figure 28:
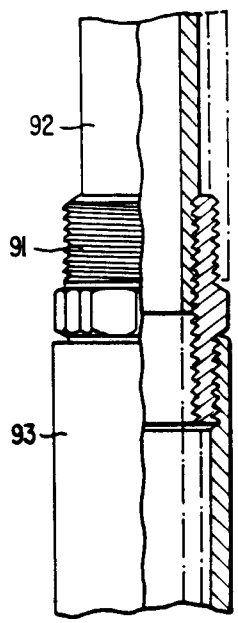
FIG. 28 illustrates an inventive, double-threaded straight-through coupling.

FIG. 28 illustrates the use of a coupling housing 91, which is provided with external and internal threads and can therefore also be used as a coupling between pipes 92 and 93 of different diameters.

Figure 29:
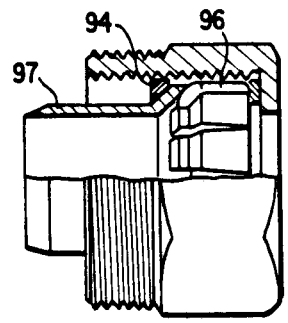
FIGS. 29 and 30 illustrate nuts for connection to housings having different clamping and sealing means.
Figure 31:
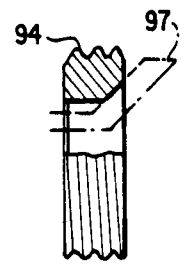
FIG. 31 illustrates the implementation of a movable locking flange for retaining the clamping and sealing means according to FIGS. 29 and 30.
Figure 30:
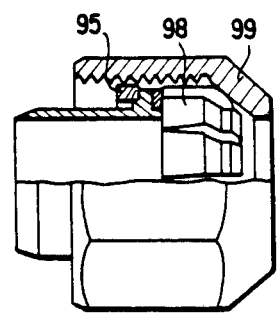
Figure 32:
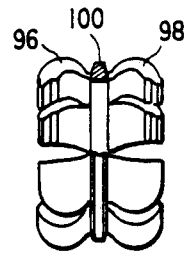
FIG. 32 illustrates a double clamp for a nut according to FIG. 30 and a sealing ring according to FIG. 29.

FIGS. 29 and 30 illustrate examples of different nuts with locking flanges in the form of movable rings 94 and 95, as heretofore described in conjunction with FIG. 18. The clamping and sealing means comprises in this case rings provided with claws, where the ring 96, as depicted in FIG. 29, is acted on by a guide ring 97, constituting a part of the clamping and sealing means as described in conjunction with FIGS. 18-20. FIG. 30 illustrates reversed implementation of a clamping ring 98, where the claws are acted on by the guide flange 99 of the nut. FIG. 32 illustrates the implementation of a clamping ring constituting a combination of the embodiments according to FIGS. 29 and 30, and could be inserted in a nut with a guide flange 99 according to FIG. 30, in which there is also included a guide ring 97 according to FIG. 29. FIG. 31 illustrates an example of the locking ring 94 included in the structure according to FIG. 29.

Figure 33:
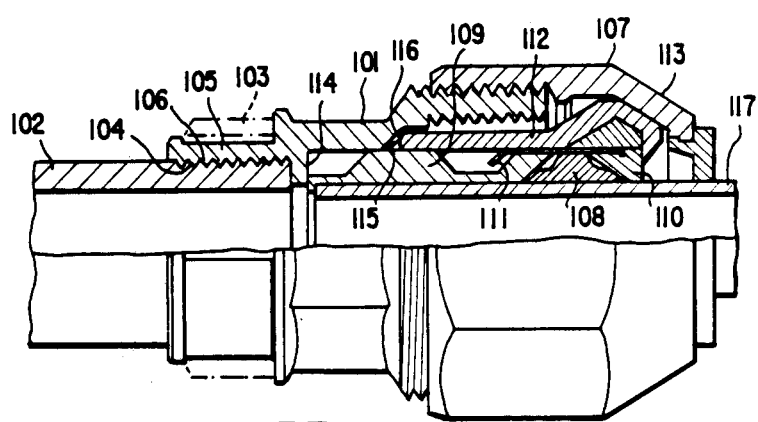
FIG. 33 illustrates an alternative coupling according to the invention, with exchangeable threads for joining pipe of different threads.

FIG. 33 illustrates a pipe coupling in accordance with the invention, where the housing 101 is provided at its end facing the pipe 102 with exchangeable threads, both external 103 and internal 104. The exchangeable threads are disposed on cylindrical surfaces fitting complementary recesses 105, 106 arranged opposite each other in the end of the housing within the area for normal threading. The threaded cylindrical surfaces are provided with optional types of thread for compatibility to all the thread types on the market. The right-hand part of the housing is formed in a manner previously described with fixed double threads for receiving a nut 107 containing a specially formed clamping and sealing means.

In this case the clamping ring comprises three parts 108, 109 and 110 which are kept together by a band 111 and retained in the nut 107 by a locking member 112 which, when the nut 107 is screwed into the housing 101, achieves compression of the three parts of the clamping means between the guide flange 113 and the sealing flange 114. However, in the screwing process the locking member 112, formed withh a cuneiform tip 115, will be pressed against an abutment 116 formed in the housing 101, thus to translate the compression forces into radial compression forces against the part 109 of the clamping and sealing means, which serves as a bush for the pipe 117. The locking member 112, forming a part of the clamping and sealing means has thus several tasks, namely (a) to retain the clamping and sealing means in the nut 107, (b) to keep the different parts 108, 109 and 110 of the clamping means together, and (c) to increase the radial pressure against the pipe 117 inserted in the coupling when the nut 117 is screwed in.

Figure 34:
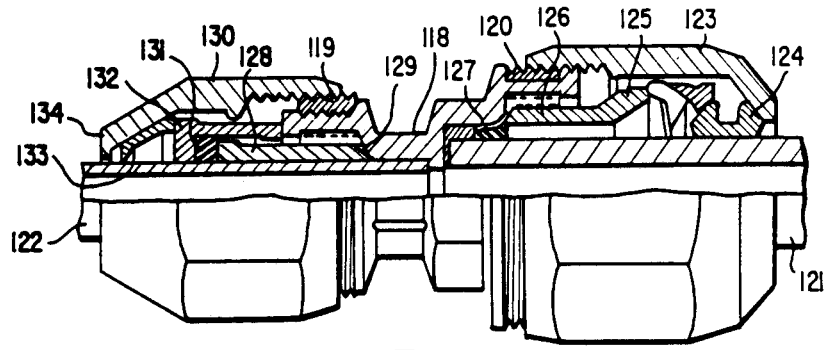
FIG. 34 illustrates another type of coupling for pipes of different dimensions and material, with only external threads on the coupling housing.

FIG. 34 illustrates a pipe coupling in accordance with the invention, where the housing 118 is provided with exchangeable threads 119, 120 and the pipes inserted in the coupling are an unthreaded plastics pipe 121 and an unthreaded metal pipe 112. A coupling housing with exchangeable threads naturally only needs to be provided with suitable threads in the recess which is to be used in the coupling in question. The plastics pipe is fixed in the coupling in a manner described hereinbefore with the aid of a nut 123 acting on the clamping and sealing means 124, 125 on being screwed in, the means being intended as reinforced fixing of the pipe. The sealing function is provided with the aid of the other part 125 of the clamping means which is provided with a cuneiform tip in a manner described above, the tip 126 being acted on radially when the nut 123 is screwed into the housing 118 for compressing a seal 127 engaging against the pipe 121. The left-hand part of the coupling has a clamping ring 128 formed in a similar manner with a conical tip 129 which is pressed directly against the surface of the pipe 122, when the nut 130 is screwed on to the housing 118, and is simultaneously wedged in between the pipe seating in the housing 118 and the pipe 122. The sealing function is provided with the aid of an elastic sealing ring 131 which is pressed against the pipe surface by both parts 128, 132 included in the clamping and sealing means. The other part 122 is furthermore formed with a gripping edge 133 for reinforced fixing of the pipe 122 in the cases where it consists of hard and smooth material. On being screwed up, the coupling then functions such that the rear gripping edge 133 glides against the hard pipe surface until the forward conical tip 129 has been firmly wedged between the housing 118 and the pipe, pursuant to which the rear gripping edge 103 of the guide flange 134 of the nut 130 is pressed into engagement with the pipe surface.

Figure 35:
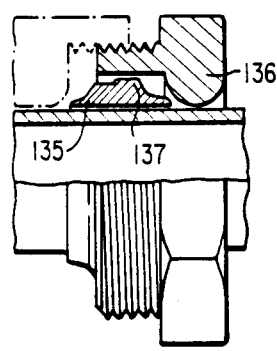
FIG. 35 illustrates a clamping and sealing means with a ring retained in the nut by means of a pin.

FIG. 35 illustrates an alternative embodiment of a clamping and sealing means comprising a standard cone 135 retained in a nut 136 by a pin 137.

Figure 36:
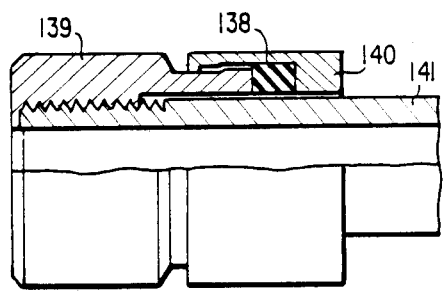
FIG. 36 illustrates an alternative clamping and sealing ring for use with threaded pipes in a coupling according to FIG. 33.

FIG. 36 illustrates an alternative embodiment of a clamping and sealing means according to FIG. 33, where the three parts 108, 109 and 110 of the clamping means have counterparts 138, 139 and 140, which are intended to seal against a threaded pipe 141, and in the same way as described in conjunction with FIG. 33, are kept in the nut 107 by a locking member 112 (not shown in FIG. 36). This type of clamping and sealing means enables the connection of pipes having one type of thread to a housing having another type of thread.

Figure 37:
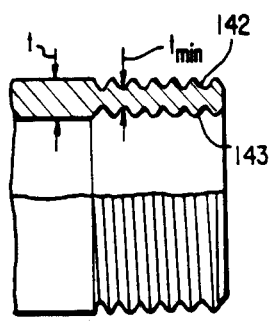
FIG. 37 is a cross section of a double thread where the roots are mutually opposing.
Figure 38:
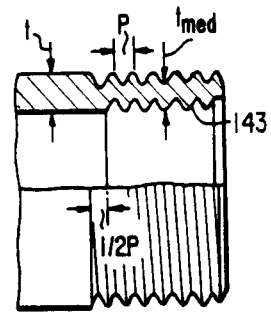
FIG. 38 illustrates an alternative for of double thread, where the roots are staggered half a pitch.
Figure 38A:
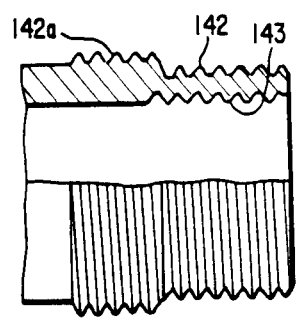
FIG. 38a illustrates a double thread with a separate thread for a locking nut.

FIGS. 37 and 38 are cross sections of such double-threaded details as coupling housings or nuts. FIG. 37 illustrates the external thread 142 and internal thread 143 disposed directly opposite each other, such that the threaded part is given dimension variations lying between the material thickness t and a least thickness $t_{min}$ at the roots of the threads. The strength of the threaded portion will of course be determined by the least thickness $t_{min}$. In FIG. 38 the threads have been mutually displaced half a pitch, resulting in that the material thickness in the threaded portion has a constant thickness $t_{med}$ lying between $t_{min}$ and t. Strength has thus been substantially increased in the threaded portion, signifying that the material thickness t for a given requirement of least strength of the thread may be reduced, which means of course that both weight and material costs are reduced. FIG. 38a illustrates an embodiment having a thread 142a for the locking nut. This thread has considerably less pitch than the pipe thread 142 which facilitates tightening the locking nut.

Figure 45:
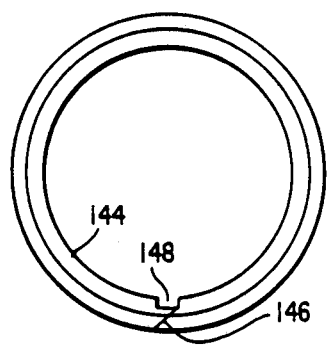
FIGS. 45 and 46 are end views of two conceivable embodiments of the exchangeable threads according to FIGS. 39-43.
Figure 46:
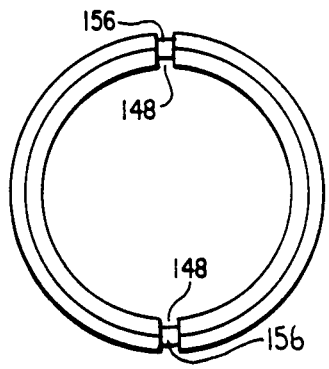
Figure 46A:
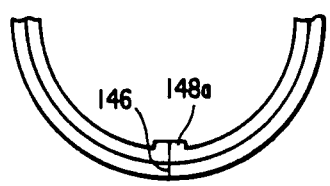
FIG. 46a illustrates an alternative implementation of exchangeable threads.
Figure 47:
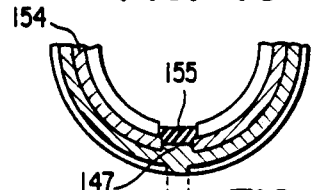
FIG. 47 is a cross section through the pipe end of FIG. 44, provided with external and internal threads.
Figure 39:
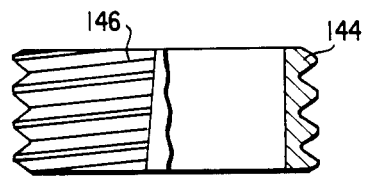
FIGS. 39–43 illustrate alternative embodiments of exchangeable external threads in accordance with the invention.
Figure 40:
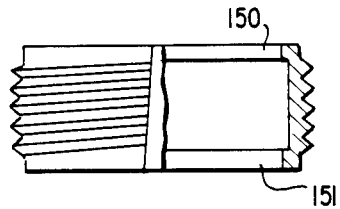
Figure 41:
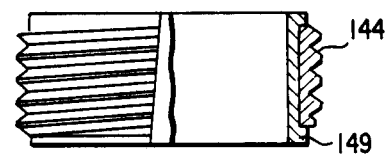
Figure 42:
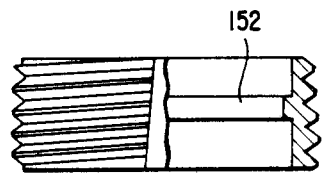
Figure 43:
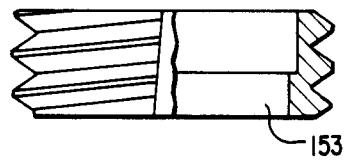
Figure 44:
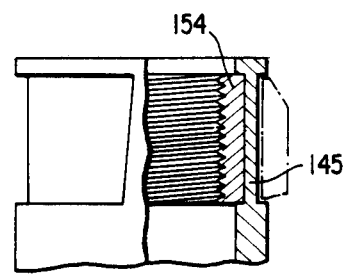
FIG. 44 illustrates the end of a coupling housing with recesses for both exterior and interior exchangeable threads.
Figure 48A:
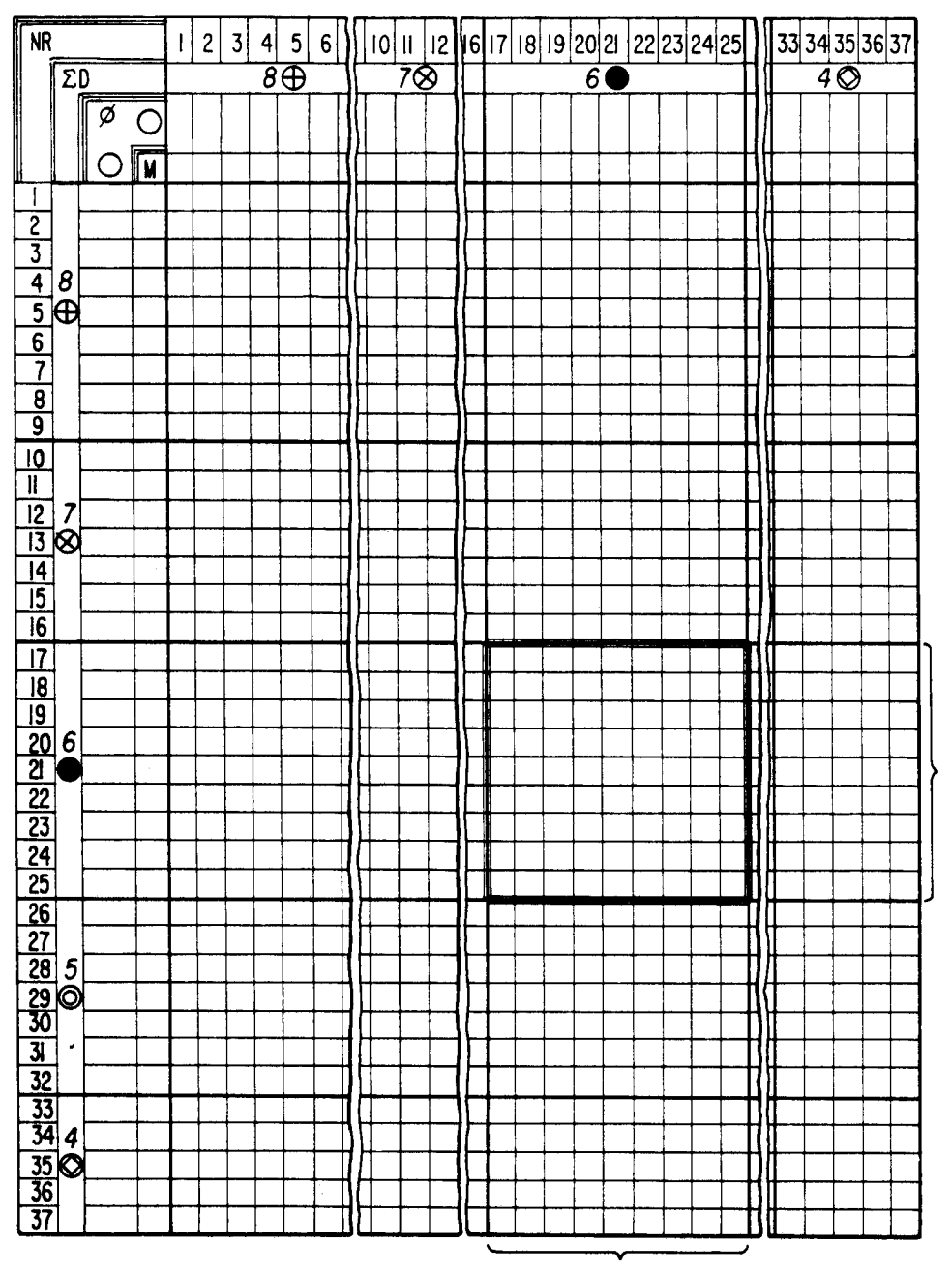
Figure 48B:
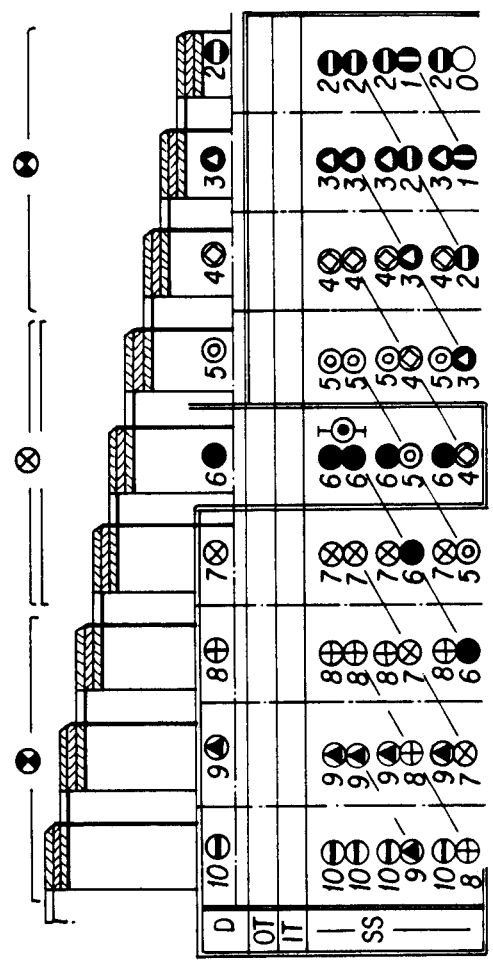
FIG. 48 is a chart showing different coupling alternatives and the details included in the alternatives.
Figure 48C:
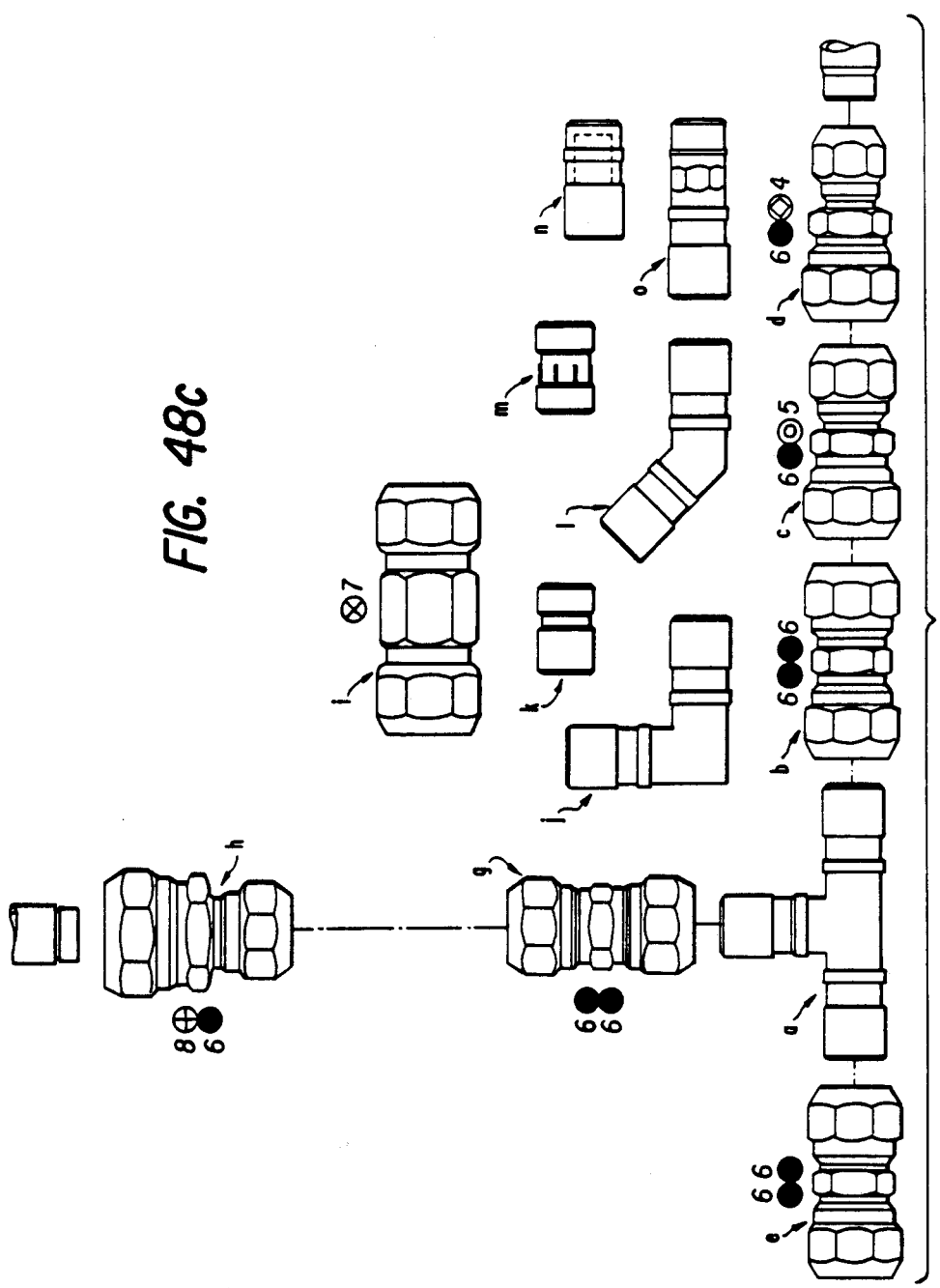
Figure 48D:
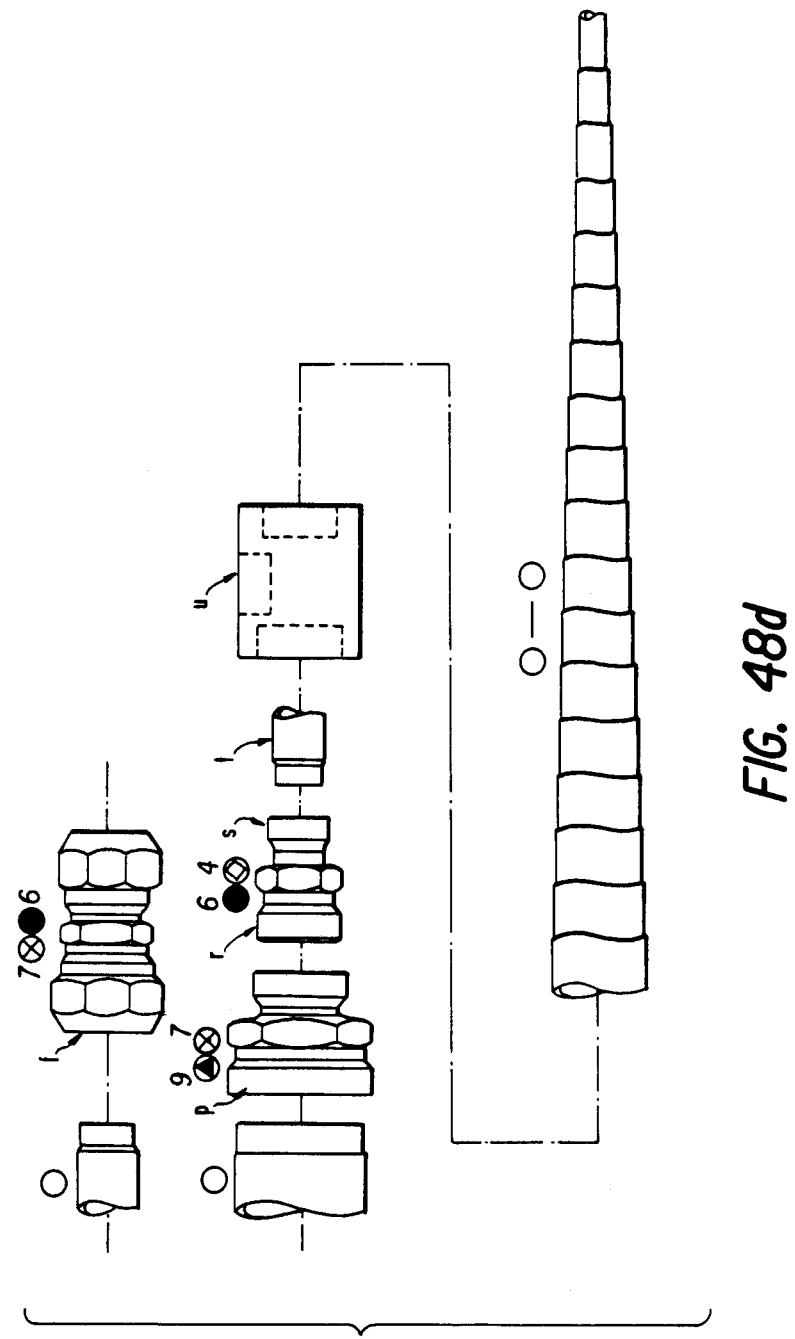

FIGS. 39–43 illustrates different cross sections and different thread pitches for exchangeable threads in accordance with the invention. As will be seen from the Figures, the threads are disposed on a cylindrical surface fitting into a complementary annular recess 145 (see FIG. 44) in a coupling housing or nut, and are provided with optional types of thread. The threaded cylindrical surface is pierced by one or more slits 146 extending substantially axially and dividing the cylindrical surface into one or more arcuate surfaces. The recess 145 formed in the housing according to FIG. 44 is provided with radially projecting abutment 147 accommodated in grooves 148 in the cylindrical surfaces for preventing or restricting peripheral rotation of these surfaces. FIGS. 39 and 41 illustrate cylindrical surfaces with a smooth bottom where, according to FIG. 41, the thread is fixed on an equalizing ring 149. FIGS. 40, 42 and 43 illustrate different embodiments having flange-shaped guide surfaces 150–153 for axial fixation of the cylindrical surfaces and intended to suit recesses having different bottoms. FIG. 44 illustrates a coupling housing provided with an internal thread 154, and a cross section of the housing is apparent from FIG. 47. An elastic connection is arranged at this internal thread, between the cylindrical surfaces, to enable clamping them together when the thread is inserted in the housing, with subsequent expansion when it is in place in the recess. FIGS. 45 and 46 illustrate end views of different implementations of cylindrical surfaces, where FIG. 45 illustrates such a surface pierced by a slit 146, while FIG. 46 illustrates two arcuate surfaces kept together by an elastic or resilient material 156, enabling an increase in diameter when the cylindrical surface is to be disposed in a recess arranged externally on the coupling member or connection. FIG. 46a illustrates an alternative embodiment where the recess is provided with a groove 148a accommodating a radially projecting abutment on the cylindrical surface. FIG. 48 illustrates with the aid of tables and a coupling schedule the assembly of a pipe coupling system in accordance with the invention, intended to cover all the pipe dimensions on the market. Some of these dimensions have been numbered from 1 to 37 in a coordinate table, where the numeral 1 denotes the largest and the numeral 37 the smallest dimension. The intersection point for the pipe dimensions which are to be coupled denotes the coordinates for the square representing the coupling in question. In the coordinate table there are also symbols in the form of circles denoting what inventive coupling corresponds to the different pipe dimensions. Each symbol covers a given number of dimension numbers and the intersections between the symbols form fields, which have been indicated in the table by double lines. The number of squares thus denote how may pipe dimensions can be connected by one pipe coupling.

In the key to the right in the Figure, the circle symbols are tabulated to correspond to the respective diameters of the different pipe couplings. Combinations of the different symbols in the key denote which combination of the two connections on an inventive coupling covers a given field in the coordinate table.

For example, the full lines in the coordinate table show the coupling facilities for pipe diameters in the diameter interval 17–25. This interval has been symbolized by a filled circle, and the corresponding field has been given two filled circles which are to be found in the key and represent a pipe coupling with two connections of the same dimension. This dimension is similarly framed by full lines and represented by a filled circle. In the use of a pipe coupling depicted by the details b, e and g according to the chart, pipes in the dimension interval 17–25 may optionally be coupled together. Suitable inner bushes of the type described in conjunction with FIG. 7 are used. Examples of such bushes are also depicted by the details k and m. The different accessories to a coupling which are identified by two filled circles have been marked, as indicated in the table, by an unfilled circle with a filled inner circle. These details may consist of e.g. a Tee as detail a, or different elbows as details j or l. The elbows or Tees have three alternative connection possibilities at either end. Both quick release couplings according to FIGS. 20 and 21 and interior threads. If the pipe dimensions fall outside the full lined area in the coordinate table, for instance when connecting two pipes No. 20 and No. 30 an adapter coupling is utilized as appears from detail c designated with the symbols filled circle, and filled circle with an unfilled inner square. A further embodiment appears from the detail d, for instance for connection between pipes No. 20 and No. 35. These joints relate to reduction of diameters but they can of course also be utilized as joints for diameter increase as appears from details h and f relating to a joint between pipes No. 20 and No. 5. The symbols which have been set above the different diameters in the right table in the form of circles with crosses and circle sectors differently filled relate to a type of repair coupling according to detail i which can be used for different dimensions. Thus, for all dimensions which are designated by the symbols filled circle, filled circle with an unfilled square, and unfilled circle with a filled inner square, a repair coupling according to detail i can be utilized.

In summary, a pipe coupling according to the invention provides a great number of different coupling alternatives with a minimum of details in order to realize all these joints. The cost for stock keeping can consequently be considerably reduced, which in hitherto known systems has involved increased economical stresses on both manufacturers and dealers.

I claim:

1. A pipe coupling comprising:
(a) a coupling housing (3) having:
   (i) a first axial end and a second axial end;
   (ii) a stepped axial bore comprising a small diameter portion opening at the first axial end of said coupling housing and a large diameter portion opening at the second axial end of said coupling housing;
   (iii) internal threads (2) in said large diameter portion of said stepped axial bore; and
   (iv) external threads (4) at the second axial end of said coupling housing (3);
(b) a guide and sealing ring (22) having a first axial end which, in use, bears against an elastic seal (13B) which in turn bears against the step (14B) in said stepped axial bore in said coupling housing (3) and a second axial end;
(c) a first clamping ring (21) having:
   (i) a through bore which, in use, receives a pipe;
   (ii) a first axial end which, in use, bears against the second axial end of said guide and sealing ring (22);
   (iii) a second axial end; and
   (iv) an external annular sloping guide surface at the second end of said first clamping ring (21), said external annular sloping guide surface tapering from a larger diameter in the direction of the first axial end of said first clamping ring (21) to a smaller diameter in the direction of the second axial end of said first clamping ring (21); and
(d) a coupling member (5) having an axial through passageway and comprising:
   (i) a first portion having internal threads sized, shaped, and position to engage the external threads (4) on said coupling housing (3);
   (ii) a first radially inwardly projecting annular flange sized, shaped, and positioned to bear against the second axial end of said coupling housing (3); and
   (iii) a second radially inwardly projecting annular flange (10) sized, shaped, and positioned to bear against the external annular sloping guide surface at the second axial end of said first clamping ring (21).

* * * * *